Feb. 17, 1942. T. H. TAYLOR 2,273,738
TRAP
Filed Sept. 7, 1940
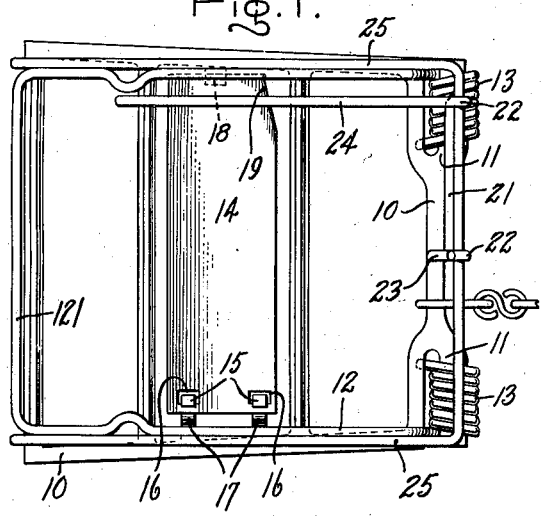
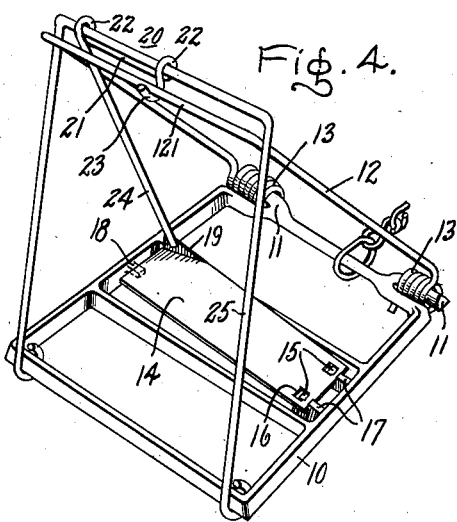
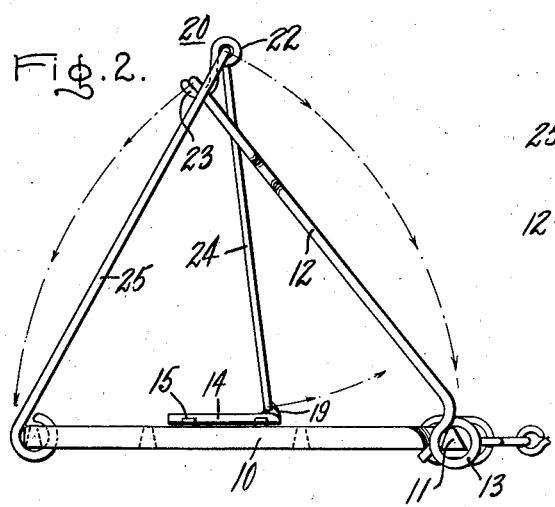
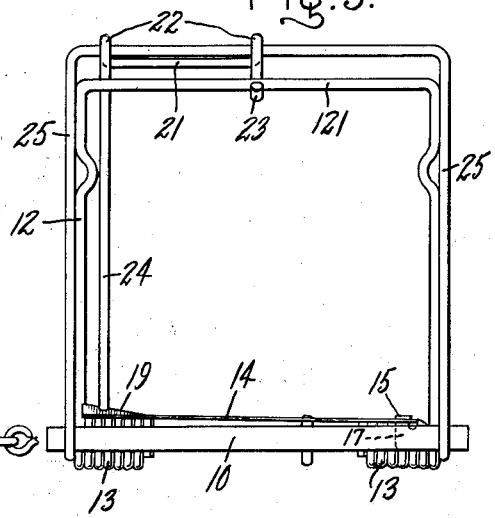
INVENTOR
THOMAS H. TAYLOR.
By
His ATTORNEY.

Patented Feb. 17, 1942

2,273,738

UNITED STATES PATENT OFFICE 2,273,738

TRAP

Thomas H. Taylor, Lake Luzerne, N. Y., assignor to Henry G. Ketchum, Lake Luzerne, N. Y.

Application September 7, 1940, Serial No. 355,721

2 Claims. (Cl. 43—81)

My invention more particularly relates to a trap particularly intended for rather small animals such as skunks, woodchucks, muskrats, civet cats and the like, and is of the type that humanely kills the animal.

My present invention is an improvement over the device shown in my Patent No. 1,003,303, September 12, 1911. In the device there shown, a jaw is pivotally mounted at one end of the frame and the successful operation of the trap depends upon this jaw engaging the body of the animal. The movement of the jaw, when set, depends, in turn, on the movement of a tripping plate produced by the animal stepping on the same. In my prior device, however, such plate was placed at one end of the device with the result that when an animal which was the intended victim stepped upon the tripping plate and sprung the trap, the movable jaw, due to its remoteness from the tripping plate, instead of engaging the back of the animal and killing it, would sometimes engage the nose of the animal and simply scare it.

One of the objects of my present invention is a tripping plate disposed at the middle portion of the base of the device thereby compelling the animal to advance to such a position when it steps on the tripping plate that the pivotally mounted jaw will strike the animal where it will deliver a fatal blow.

A further object of my invention is a novel form of tripping plate which co-acts with a trigger in a novel manner, and which renders the tripping mechanism adjustable.

A further object of my invention is a trap which is rugged, cheap, and effective in operation.

Other objects of my invention will appear in the specification and the novel features thereof will be particularly pointed out in the claims.

My invention will best be understood by reference to the accompanying drawing in which Fig. 1 is a plan view of the trap embodying my invention;

Fig. 2 is a side view thereof when the trap is in set position;

Fig. 3 is a front view, and

Fig. 4 is a perspective view of the trap in set position.

Like reference characters indicate like parts throughout the drawing.

Referring to the drawing 10 is a base which forms a fixed jaw for the trap and is preferably formed of malleable iron or the like. The base is provided on opposite sides with lugs 11 which form bearings for a pivotally mounted jaw 12 in the form of a yoke and the ends of which are formed into coil springs 13 which surround the lugs 11 and are attached thereto and are placed under compression when the jaw is raised away from the base.

A tripping plate 14 extends transversely of the base of the middle portion thereof and is pivotally mounted as at 15, openings 16 at one end of the plate preferably engaging lugs 17 which are formed on the base.

The opposite end of the tripping plate 14 normally engages a lug 18 for the purpose of preventing the plate from passing beneath the base when the plate is depressed. The plate 14 is provided with an upwardly extending lip 19 as best shown in Fig. 4 for a purpose which will be more fully hereinafter described.

A tripping element indicated generally at 20, here shown in the form of a continuous rod or wire, has a portion 21 extending along the outer portion of the bail 25 and formed with loops or rings 22 surrounding the outer portion of the pivotally mounted bail 25 and having an integral hook 23 (Fig. 2). The opposite end of the tripping element is provided with a downwardly extending bar or wire 24 the lower end of which, when the trap is set, engages the lip 19 on the tripping plate and retains the trap in the set position.

A bail 25 which is shaped similarly to the pivotally mounted jaw 12 but pivoted to the opposite end of said base from said jaw cooperates with the fixed jaw to retain the trap in set position.

The trap is set in the following manner. The foot is placed on the base of the trap to hold the same firm, and the pivotally mounted jaw 12 is raised away from the base thereby placing the springs 13 which form the ends of the movable jaw under compression. At the same time the bail 25 is elevated and the outer ends of the movable jaw and the bail are brought approximately together and the hook 23 is caused to engage the outer end of the movable jaw and then by bringing the lower end of the bar 24 into engagement with the lip 19 which is formed on the tripping plate, the trap is set. It will be understood that by bending the lower end of the bar 24 one way or the other, more or less pressure will be required to spring the trap.

It will be noted that the lengths and forms of the movable jaw and of the bail are such that when the trap is set as shown in Fig. 4 the cross bar at the end of the movable jaw is received within the bail and beneath the cross bar thereof so that when the trap is sprung, the movable jaw is free to move downwardly between the side legs of the bail and the cross bar of the movable jaw is free to engage the body of the animal.

In use it will be understood that the trap is set in such a position that the animal will pass through the bail 25 and when he steps upon the tripping plate 14, the lip 19 is brought out of engagement with the bar 24 and the hook 23 is released and the outer end of the movable jaw strikes the animal on the neck or adjacent portion of the body and instantly kills it.

The trap may be used as a runway trap or as a bait trap as desired.

While I have described my invention in its preferred embodiment, it is to be understood that the words which I have used are words of description rather than of limitation. Hence, changes within the purview of the appended claims may be made without departing from the true scope and spirit of my invention in its broader aspects.

What I claim is:

1. In a trap of the swinging jaw type the combination of a swingable jaw, a base on which said jaw is pivoted and which constitutes a stationary jaw, a bail pivoted to said base opposite to the first pivot, a trigger generally rectangular in form and substantially centrally positioned and pivoted to said base, said trigger having at one corner thereof an upwardly extending part, said pivoted jaw and bail in set position intersecting directly above the trigger, a trigger means suspended from the bail and engaging said upwardly extending part in set position, and a holding means to retain the trigger in set position.

2. In a trap of the swinging jaw type having a swingable jaw, a base on which said jaw is pivoted and which constitutes a stationary jaw, and a bail pivoted to said base opposite to the first pivot, the combination of a trigger plate generally rectangular in form and substantially centrally positioned and adapted to be pivoted at one end to the base and which has an upwardly extending part on a corner opposite the pivotal end of the trigger, a trigger means adapted to be suspended from the bail and engaging said upwardly extending part in set position, and a holding means to retain the trigger in set position.

THOMAS H. TAYLOR.